(12) United States Patent
Low et al.

(10) Patent No.: US 8,203,527 B2
(45) Date of Patent: Jun. 19, 2012

(54) MINIMIZING PEN STROKE CAPTURE LATENCY

(75) Inventors: Yun Shon Low, Richmond (CA); Jimmy Kwok Lap Lai, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 564 days.

(21) Appl. No.: 12/429,607

(22) Filed: Apr. 24, 2009

(65) Prior Publication Data

US 2010/0271313 A1   Oct. 28, 2010

(51) Int. Cl.
*G09G 5/00* (2006.01)
(52) U.S. Cl. ......... 345/107; 345/173; 345/179; 345/204
(58) Field of Classification Search .................. None
See application file for complete search history.

(56) References Cited

U.S. PATENT DOCUMENTS

| | | |
|---|---|---|
| 5,444,457 A | 8/1995 | Hotto |
| 5,627,558 A | 5/1997 | Hotto |
| 5,831,588 A | 11/1998 | Hotto |
| 2008/0309636 A1* | 12/2008 | Feng et al. ............. 345/173 |
| 2009/0256799 A1* | 10/2009 | Ohkami et al. ......... 345/107 |

* cited by examiner

*Primary Examiner* — Joseph Haley
(74) *Attorney, Agent, or Firm* — Mark P. Watson

(57) ABSTRACT

A method includes receiving first touch point data from a sensor, generating first data pixels corresponding with the received first touch point data, and updating first display pixels of a display device with the first data pixels using a first drive scheme. The display pixels of the display device may have multiple stable display states and the first data pixels may be generated by a first unit. The method may further include receiving second touch point data from the sensor, generating second data pixels corresponding with the received second touch point data, and updating second display pixels of the display device with the second data pixels using a second drive scheme. The first and second drive schemes may be different drive schemes. The second data pixels may be generated by the first unit.

20 Claims, 10 Drawing Sheets

MINIMIZING PEN STROKE CAPTURE LATENCY

TECHNICAL FIELD

This application relates to driving or updating active-matrix, electro-optic display devices with display pixels having multiple stable display states.

BACKGROUND

An electro-optic material has at least two "display states," the states differing in at least one optical property. An electro-optic material may be changed from one state to another by applying an electric field across the material. The optical property may or may not be perceptible to the human eye, and may include optical transmission, reflectance, or luminescence. For example, the optical property may be a perceptible color or shade of gray.

Electro-optic displays include the rotating bichromal member, electrochromic medium, electro-wetting, and particle-based electrophoretic types. Electrophoretic display ("EPD") devices, sometimes referred to as "electronic paper" devices, may employ one of several different types of electro-optic technologies. Particle-based electrophoretic media include a fluid, which may be either a liquid, or a gaseous fluid. Various types of particle-based EPD devices include those using encapsulated electrophoretic, polymer-dispersed electrophoretic, and microcellular media. Another electro-optic display type similar to EPDs is the dielectrophoretic display.

Generally, an image is formed on an electro-optic display device by individually controlling the display states of a large number of small individual picture elements or display pixels. A data pixel having one or more bits defines a particular display state of a display pixel. A frame of data pixels defines an image. Commonly, the display pixels are arranged in rows and columns forming a display matrix. An exemplary electro-optic display pixel includes a layer of electro-optic material situated between a common electrode and a pixel electrode. One of the electrodes, typically the common electrode, may be transparent. The common and pixel electrodes together form a parallel plate capacitor at each display pixel, and when a potential difference exists between the electrodes, the electro-optic material situated in between the electrodes experiences the resulting electric field.

An active-matrix display includes at least one non-linear circuit element, such as a transistor, for each display pixel. An exemplary active-matrix display pixel includes a thin-film transistor having its drain terminal coupled with the pixel electrode. The gate and source terminals of the transistor are respectively coupled with a row select line and a column data line. To change the display state of the display pixel, the common electrode is placed at ground or some other suitable voltage and a row driver circuit turns on the transistor by driving a suitable voltage on the row select line. An optical-property-dependent voltage corresponding with a display state transition may then be driven on the column data line by a column driver circuit.

An electro-optic display device may have display pixels that have multiple stable display states. Display devices in this category are capable of displaying (a) multiple display states, and (b) the display states are considered stable. With respect to (a), display devices having multiple stable display states include electro-optic displays that may be referred to in the art as "bistable." The display pixels of a bistable display have first and second stable display states. The first and second display states differ in at least one optical property, such as a perceptible color or shade of gray. For example, in the first display state, the display pixel may appear black and in the second display state, the display pixel may appear white. In addition, display devices having multiple stable display states include devices having display pixels that have three or more stable display states. Each of the multiple display states differ in at least one optical property, e.g., light, medium, and dark shades of a particular color. As another example, a display device having multiple stable states may have display pixels having display states corresponding with 4, 8, 16, 32, or 64 different shades of gray.

With respect to (b), the multiple display states of a display device may be considered to be stable, according to one definition, if the persistence of the display state with respect to display pixel drive time is sufficiently large. The display state of a display pixel may be changed by driving a drive pulse (typically a voltage pulse) on the column data line of the display pixel until the desired appearance is obtained. Alternatively, the display state of a display pixel may be changed by driving the column data line over time with a series of drive pulses regularly spaced in time. In either case, the display pixel exhibits a new display state at the conclusion of the drive time. If the new display state persists for at least several times the minimum duration of the drive time, the new display state may be considered stable. Generally, in the art, the display states of display pixels of LCDs and CRTs are not considered to be stable, whereas the display states of EPD display pixels are considered stable.

An advantage of electro-optic displays, in general, and EPD devices, in particular, is that once a display pixel has been placed in a particular display state, the pixel will maintain that display state for a long period of time—at a minimum one or more minutes and up to hours, days, months, or longer—without drawing power. EPD devices need only be refreshed when a change in the appearance of the rendered image is desired or after the brightness of the rendered image diminishes below a desired level. In contrast, other types of display technologies maintain their display state for much shorter time periods. For example, the display pixels of a liquid crystal display ("LCD") maintain their optical appearance for less than a second. However, in comparison with other display technologies, such as LCDs, EPD devices require relatively long drive times to cause a display pixel to assume a new display state. Thus, changing an image rendered on an EPD device may take longer than desired.

EPD devices may be used in electronic readers. The electronic reader may be used to read books, newspapers, magazines, and other documents. Oftentimes, the reader of a paper document will mark the document with a pen or pencil, such as to circle something of interest or to write notes in the margin. Some readers of a paper document, such as students, highlight passages of text with a light-colored marker. In addition, many paper documents are designed with places for the reader to write information. Examples of documents of this type range from business forms to crossword puzzles. Providing the ability to "write" on a document displayed an electronic paper device would be an advantage.

LCDs and CRTs may be provided with a sensor capable of detecting pen input. A variety of technologies have been developed in which display devices are capable of receiving input from a pen or other pointing device. For example, resistive, capacitive, acoustic, and light pen touch screens are known.

In a display device with a sensor capable of detecting pen input there is a certain amount of processing time associated with displaying a pen stroke captured by the sensor. This pen stroke capture latency would add to the time required to update an image rendered on a display device. Accordingly, there is a need for methods and apparatus for minimizing pen stroke capture latency.

SUMMARY OF DISCLOSURE

In one embodiment, a method includes receiving first touch point data from a sensor, generating first data pixels corresponding with the received first touch point data, and updating first display pixels of a display device with the first data pixels using a first drive scheme. The display pixels of the display device may have multiple stable display states and the first data pixels may be generated by a first unit.

In one embodiment, the method may further include receiving second touch point data from the sensor, generating second data pixels corresponding with the received second touch point data, and updating second display pixels of the display device with the second data pixels using a second drive scheme. The first and second drive schemes may be different drive schemes. The second data pixels may be generated by the first unit.

One embodiment is directed to a display controller. The display controller may include a first memory to store data pixels and a second memory to store synthesized pixels. The display controller may include a first unit to receive touch point data from a sensor, to generate data pixels corresponding with received touch point data, and to store generated data pixels in the first memory. In addition, the display controller may include a second unit to generate synthesized pixels from the data pixels generated by the first unit, and to store the synthesized pixels in a second memory. Further, the display controller may include a third unit to update display pixels of a display device with drive pulses corresponding with the synthesized pixels, the display pixels of the display device having multiple stable display states.

In one embodiment, the second unit of the display controller is operable to generate first synthesized pixels from first data pixels generated by the first unit, the first data pixels corresponding with first touch point data. In addition, the second unit is operable to generate second synthesized pixels from second data pixels stored in the first memory. The second data pixels may have been stored in the first memory by a host. Further, the third unit is operable to update display pixels of the display device with drive pulses corresponding with the first and second synthesized pixels. The first synthesized pixels may be updated using a first drive scheme and the second synthesized pixels may be updated using a second drive scheme.

DETAILED DESCRIPTION

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Figure 1:
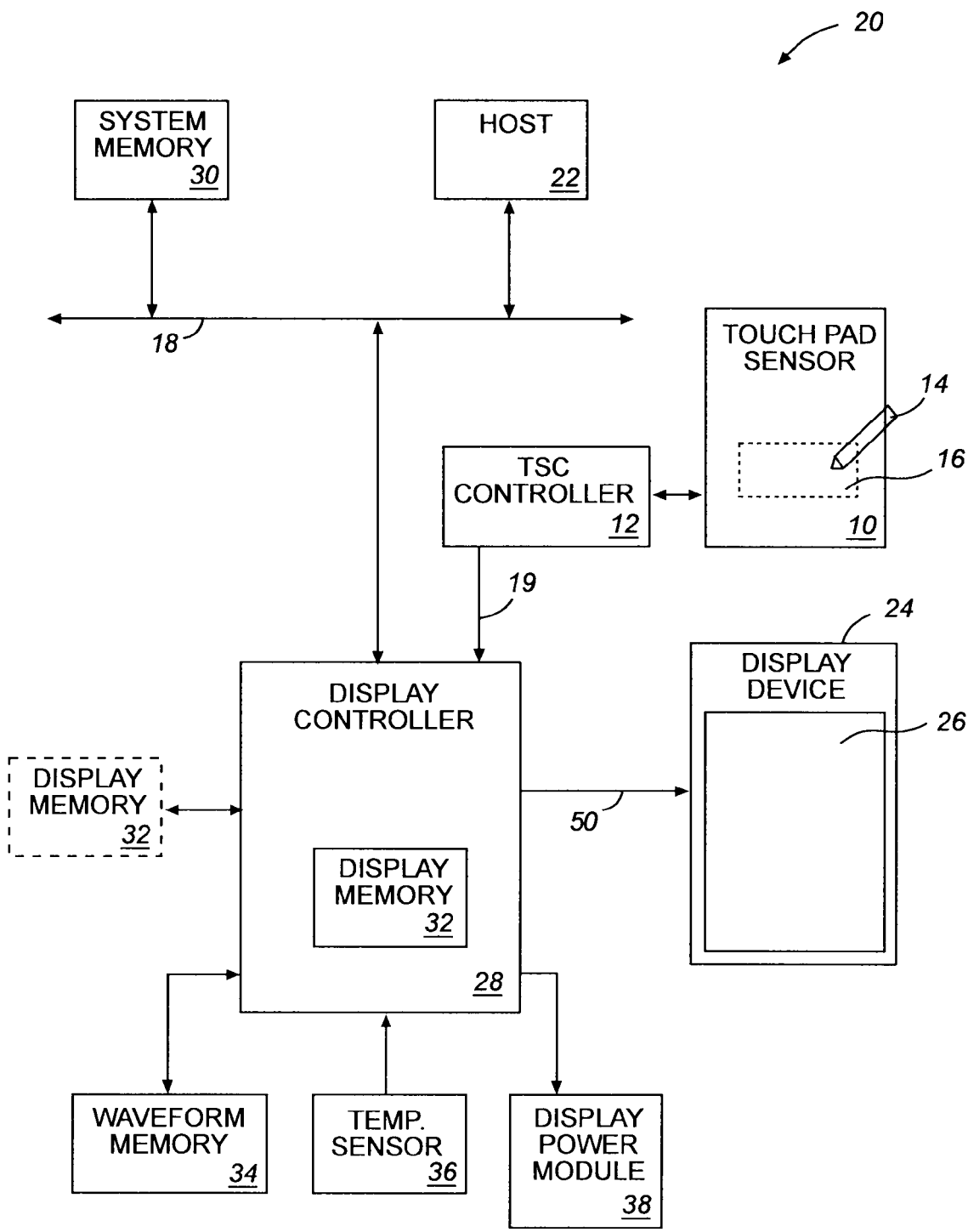
FIG. 1 is a block diagram of an exemplary display system having a display device, a display controller, and a touch pad sensor.

FIG. 1 illustrates a block diagram of an exemplary display system 20 illustrating one context in which embodiments may be implemented. The system 20 includes a host 22, a display device 24 having a display matrix 26, a display controller 28, and a system memory 30. The system 20 also includes a display memory 32, a waveform memory 34, a temperature sensor 36, and a display power module 38. Further, the system 20 includes an exemplary "touch pad" sensor 10 and touch sensor controller ("TSC") 12. In one embodiment, a pen 14 may be used to designate pen input to the sensor 10. While the sensor 10 and display matrix 26 are shown in separate locations in the block diagram, it will be appreciated that one may be superimposed on and aligned with the other. In addition, the system 20 includes a first bus 18, a second bus 19, a bus 50, as well as the shown buses interconnecting system components. The system 20 may be any digital system or appliance. In one embodiment, the system 20 is a battery powered (not shown) portable appliance, such as an electronic reader. FIG. 1 shows only those aspects of the system 20 believed to be helpful for understanding the disclosed embodiments, numerous other aspects having been omitted.

The host 22 may be a general purpose microprocessor, digital signal processor, controller, computer, or any other type of device, circuit, or logic that executes instructions of any computer-readable type to perform operations. Any type of device that can function as a host or master is contemplated as being within the scope of the embodiments.

In one embodiment, the display device 24 may be an electro-optic display device with display pixels having multiple stable display states in which individual display pixels may be driven from a current display state to a new display state by series of two or more drive pulses. In one alternative, the display device 24 may be an electro-optic display device with display pixels having multiple stable display states in which individual display pixels may be driven from a current display state to a new display state by a single drive pulse. The display device 24 may be an active-matrix display device. In one embodiment, the display device 24 may be an active-matrix, particle-based electrophoretic display device having display pixels that includes one or more types of electrically-charged particles suspended in a fluid, the optical appearance of the display pixels being changeable by applying an electric field across the display pixel causing particle movement through the fluid.

In one embodiment, the display controller 28 may be disposed on an integrated circuit ("IC") separate from other elements of the system 20. In an alternative embodiment, the display controller 28 need not be embodied in a separate IC. In one embodiment, the display controller 28 may be integrated into one or more other elements of the system 20. The display controller 28 is further described below.

The system memory 30 may be may be an SRAM, VRAM, SGRAM, DDRDRAM, SDRAM, DRAM, flash, hard disk, or any other suitable memory. The system memory may store instructions that the host 22 may read and execute to perform operations. The system memory may also store data.

The display memory 32 may be an SRAM, VRAM, SGRAM, DDRDRAM, SDRAM, DRAM, flash, hard disk, or any other suitable memory. The display memory 32 may be a separate memory unit (shown in dashed lines), such as a separate IC, or it may be a memory embedded in the display controller 28, as shown in FIG. 1. The display memory 32 may be employed to store one frame of pixel data and one frame of synthesized pixel data. In one embodiment, the display memory 32 may be used to store instructions or data.

The waveform memory 34 may be a flash memory, EPROM, EEPROM, or any other suitable non-volatile memory. The waveform memory 34 may store one or more different drive schemes, each drive scheme including one or more waveforms used for driving a display pixel to a new display state. The waveform memory 34 may include a different set of waveforms for one or more update modes. The waveform memory 34 may include waveforms suitable for use at one or more temperatures. The waveform memory 34 may be coupled with the display controller 28 via a serial or parallel bus. In one embodiment, the waveform memory 34 may be used to store instructions or data.

The drive pulse (or more typically, the series of drive pulses) required to change the display state of a display pixel to a new display state depends on temperature and other factors. To determine temperature, the temperature sensor 36 is provided. The temperature sensor 36 may be a digital temperature sensor with an integrated Sigma Delta analog-to-digital converter or any other suitable digital temperature sensor. In one embodiment, the temperature sensor 36 includes an I$^2$C interface and is coupled with the display controller 28 via the I$^2$C interface. The temperature sensor 36 may be mounted in a location suitable for obtaining temperature measurements that approximate the actual temperatures of the display pixels of the display device 24. The temperature sensor 36 may be coupled with the display controller 28 in order to provide temperature data that may be used in selecting a display pixel drive scheme.

The power module 38 is coupled with the display controller 28 and the display device 24. The power management unit 38 may be a separate IC. The power module 38 receives control signals from the display controller 28 and generates drive pulses of appropriate voltage (or current) to drive selected display pixels of the display device. In one embodiment, the power management unit 38 may generate voltages of +15V, −15V, or 0V. When drive pulses are not needed, the power module 38 may be powered down or placed in a standby mode.

Figure 2:
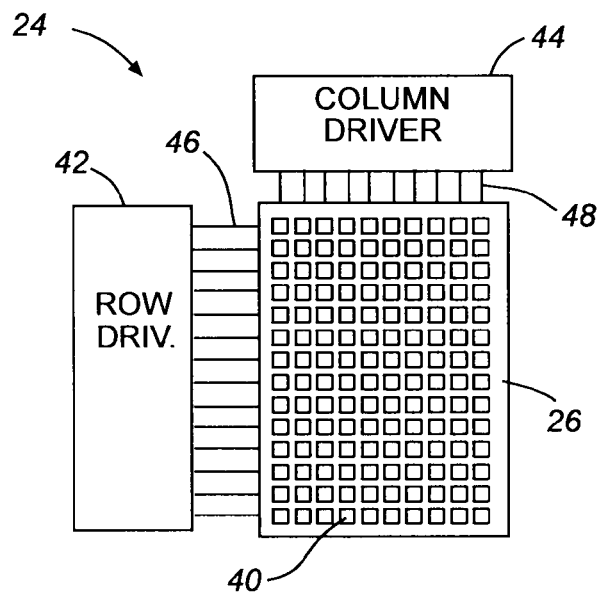
FIG. 2 is a schematic view of the display device of FIG. 1, the display device having a display matrix.

FIG. 2 shows a schematic view of the display device 24. An image may be formed on the display device 24 by individually controlling the display states of a large number of small individual picture elements ("display pixels") 40. The display device 24 includes a display matrix 26 of display pixels 40. In one embodiment, each display pixel 40 includes an active switching element (not shown in FIG. 2), such as a thin-film transistor. The switching elements are selected and driven by row driver 42 and a column driver 44. In operation, the row driver 42 may select one of the row select lines 46, turning on all of the switching elements in the row. The column driver 44 may provide a drive pulse on one or more selected column data lines 48, thereby providing a drive pulse to the display pixel located at the intersection of selected row and column lines.

The display device 24 may be coupled with the display controller 28 via one or more buses 50 that the display controller uses to provide pixel data and control signals to the display. The display state of a display pixel 40 is defined by one or more bits of data, which may be referred to as a "data pixel." An image is defined by data pixels and may be referred to as a "frame." Commonly, the display pixels are arranged in rows and columns forming a matrix ("display matrix") 26. There is a one-to-one correspondence between data pixels of a frame and the display pixels 40 of a corresponding display matrix 26.

Figure 3:
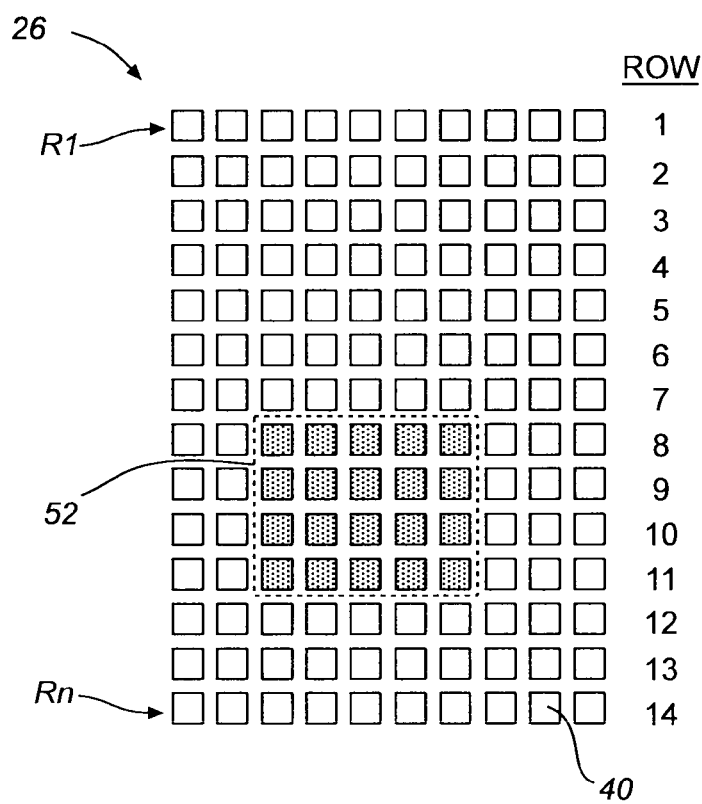
FIG. 3 is a schematic view of the exemplary display matrix of FIG. 2, the display matrix having display pixels.

FIG. 3 shows a schematic view of an exemplary display matrix 26 of display pixels 40. The display device 24 includes a display matrix 26 of display pixels 40 for displaying a frame of pixel data. The display matrix 26 may include any number of rows and columns of display pixels. As one example, the display matrix includes 480 rows and 640 columns. The display matrix 26 includes a first row RI. The display matrix 26 may include one or more submatrices 52. In one embodiment, the display submatrix 52 defines a pop-up menu. In another embodiment, the display submatrix 52 defines a cursor. In another embodiment, the display submatrix 52 defines a dialog box. In another embodiment, the display submatrix 52 defines an image created by pen input.

The display pixels 40 of the display matrix 26 of the display device 24 may have multiple stable states. In one embodiment, the display device 24 is a display device having display pixels 40 having three or more stable display states, each display state differing in at least one optical property. In one alternative embodiment, the display device 24 is a bistable display device having display pixels 40 which have first and second stable display states, each state differing from the other in at least one optical property. The display state of a display pixel 40 may be persistent with respect to drive time. In one embodiment, the display state of a display pixel 40 persists for at least two or three times the minimum duration of the drive time. In addition, in one embodiment, the drive pulse required to change the display state of a display pixel 40 from a current display state to a new display state strongly depends on the current display state.

In one embodiment, the display device 24 includes a layer of electro-optic material situated between a common electrode and a pixel electrode. One of the electrodes, typically the common electrode, may be transparent. The common and pixel electrodes together form a parallel plate capacitor, and when a potential difference exists between the electrodes, the electro-optic material situated in between the electrodes experiences the resulting electric field. This general arrangement may be in the form of one parallel plate capacitor at each display pixel, or more than one parallel plate capacitor at each display pixel.

Figure 4:
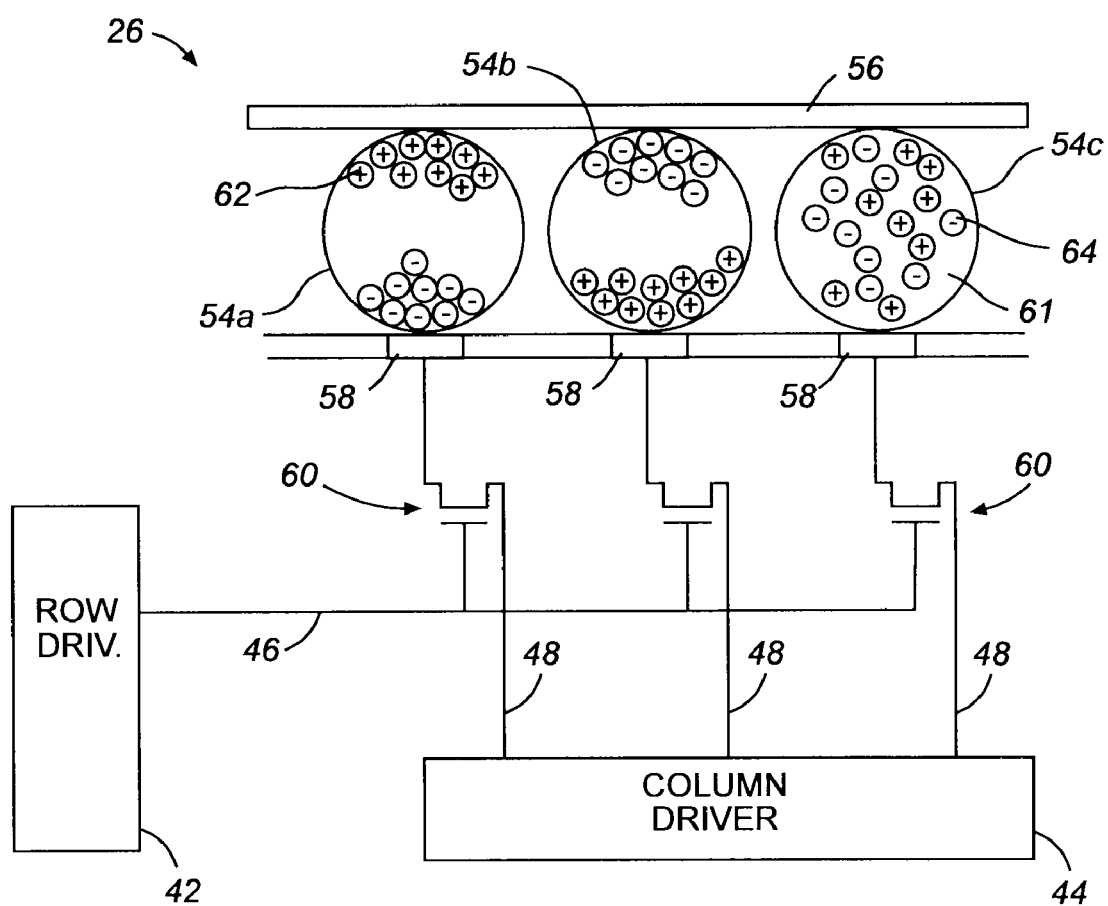
FIG. 4 is a diagram illustrating electrophoretic media disposed between electrodes in an active-matrix arrangement forming one or more display pixels.

FIG. 4 is a diagram illustrating one exemplary arrangement of one type of electrophoretic media disposed between a common electrode and a pixel electrode, one type of nonlinear circuit element of an active-matrix, and row and column driving circuits. FIG. 4 includes a simplified representation of a portion of the exemplary electrophoretic display 26 in crosssection, a schematic diagram of a portion of the associated nonlinear circuit elements, and a block diagram of row and column driving circuits 42, 44. Referring to FIG. 4, one or more microcapsules 54 are sandwiched between common electrode 56 and pixel electrode 58. The common electrode 56 may be transparent. The drain terminal of a thin-film transistor 60 is coupled with the pixel electrode 58. The gate terminals of the thin-film transistors 60 are coupled with the row driver 42 via row select line 46. The source terminal of each thin-film transistor 60 is coupled with column driver 44 via the column data line 48. Each display pixel may correspond with one microcapsule 54 as shown in FIG. 4, or may correspond with two or more microcapsules (not shown). Each microcapsule 54 may include positively charged white particles 62 and negatively charged black particles 64 suspended in a fluid 61.

To change the display state of a display pixel 40, the common electrode 56 is placed at ground or some other suitable voltage and the row driver circuit 42 turns on all of the transistors 60 in one of the rows by driving a suitable voltage on the row select line 46. The column driver circuit 44 then drives a drive pulse on the column data lines 48 of data pixels having their display state changed. As charge builds up on the common and pixel electrodes 56, 58 an electric field is established across the microcapsule(s) 54 associated with a particular display pixel. When the electric field is positive, the white particles 62 move toward the electrode 56, which results in the display pixel becoming whiter in appearance. On the other hand, when the electric field is negative, the black particles 64 move toward the electrode 56, which results in the display pixel becoming blacker in appearance. The microcapsule 54*a* is a simplified representation of a display pixel that is completely white and the microcapsule 54*b* is a simplified representation of a display pixel that is completely black. In addition, the microcapsule 54*c* illustrates a display pixel having a gray-scale value other than completely white or black, i.e., gray.

So long as charge is stored on the common and pixel electrodes 56, 58 there will be an electric field across the display pixel causing particle movement through the fluid. It will be appreciated that even after the row driver circuit 42 turns a transistor 60 off, or the column driver circuit 44 stops driving a drive pulse on the column data line 48, charge may remain on the common and pixel electrodes 56, 58, i.e., the field does not instantly collapse. In addition, particles 62, 64 may have momentum. Accordingly, particle movement through the fluid may continue for some time after a display pixel has been driven.

While the display state of a display pixel may be changed by having the column driver apply and hold an appropriate drive pulse on the column data line 48 until the desired display state is obtained in a single time interval, alternative methods may be employed for changing the display state of a display pixel. Various alternative methods provide for driving a series of drive pulses over time. In these methods, the display matrix 26 is refreshed or updated in a series of two or more "drive frames." For each drive frame in the series, each row is selected once, allowing the column driver 44 to drive a drive pulse onto each display pixel of the selected row having its display state changed. The duration of time that each row is selected may be identical so that each drive frame in the series is of identical duration. Thus, instead of changing the display state of a display pixel with a single drive pulse in a single time period, the display state may be changed by driving a series of drive pulses in a series of time periods regularly spaced in time.

Figure 5:
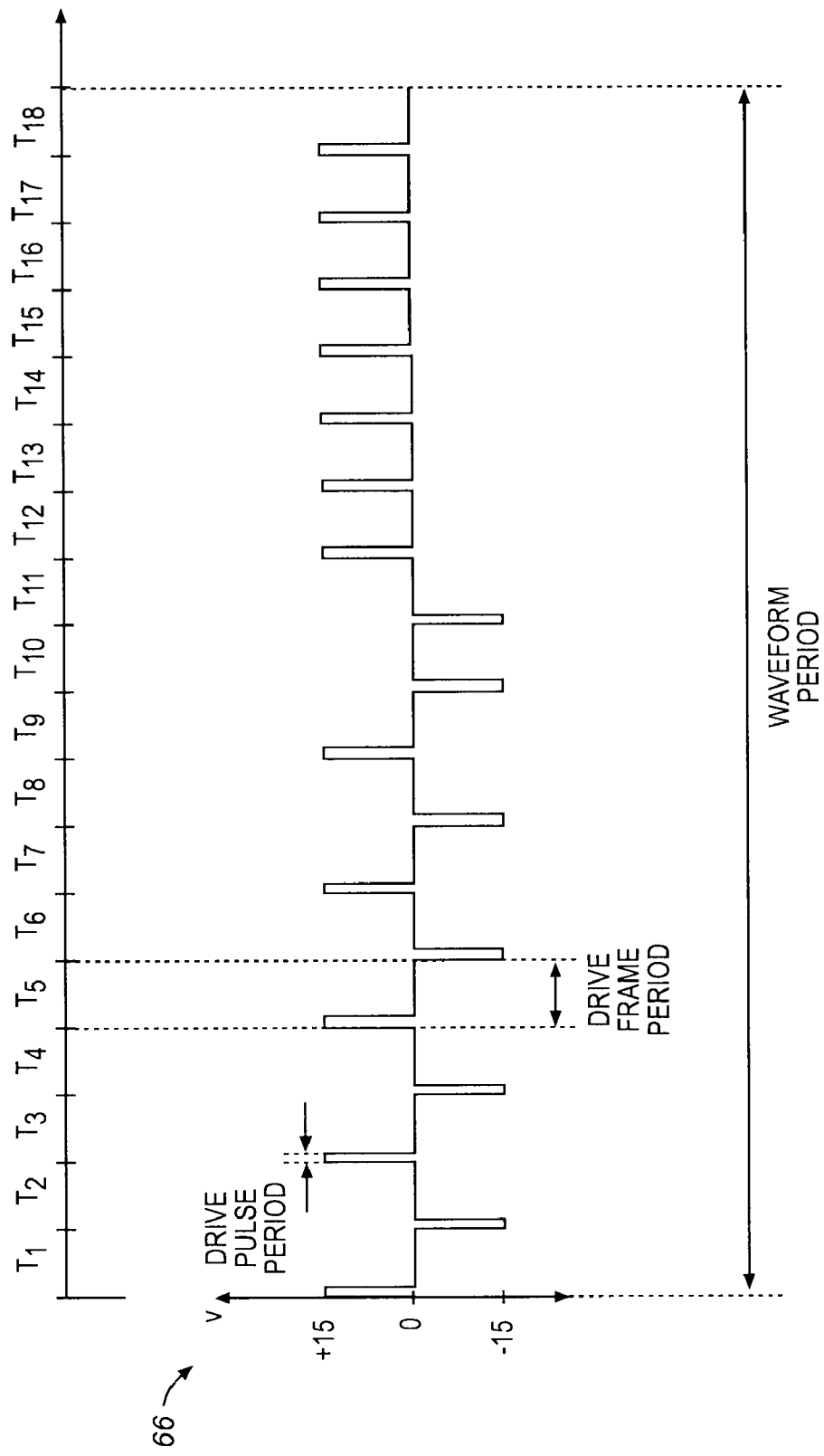
FIG. 5 is a timing diagram of an exemplary waveform used to change a display state of a display pixel.

FIG. 5 shows an exemplary waveform 66. The term "waveform" may be used in this description to denote the entire series of drive pulses occurring in a series of time periods regularly spaced in time that are used to cause a transition from some initial display state to a final display state. A waveform may include one or more "pulses" or "drive pulses," where a pulse or a drive pulse generally refers to the integral of voltage with respect to time, but may refer to the integral of current with respect to time. The term "drive scheme" may be used in this description to refer to a set of waveforms sufficient to effect all possible transitions between display states for a specific display device under particular environmental conditions.

The waveform 66 is provided for the purpose of illustrating features of waveforms generally and for defining terms. The waveform 66 is not intended to depict an actual waveform. The time periods shown in FIG. 5 are not intended to be to scale. The time period in which a single drive pulse is driven may be referred to as the "drive pulse period." In one embodiment, the drive pulse periods are of identical duration. The time period in which all of the lines of a display matrix 26 are addressed once may be referred to as the "drive frame period." In one embodiment, each drive frame period is of identical duration. The time associated with the entire series of drive frame periods may be referred to as the "waveform period." The "drive time" of a display pixel 40 may be equal to a waveform period.

The display device 24 may make use of multiple drive schemes. For example, the display device 24 may use a gray scale drive scheme ("GSDS"), which can be used to cause transitions between all possible gray levels. In addition, display device 24 may use a monochrome drive scheme ("MDS"), which can be used to cause transitions only between two gray levels, e.g., black or white. Further, the display device 24 may use a pen update mode (PU), which can be used to cause transitions having an initial state that includes all possible gray levels and a final state of either black or white. The MDS and PU drive schemes typically provide quicker rewriting of the display than the GSDS drive scheme. A drive scheme may be selected based on the type of display state transitions that are needed. For instance, if display pixels may take any one of 16 gray levels and the region being updated includes display pixels transitioning from 10 to 15, then the GSDS drive scheme must be used. However, if the region being updated includes display pixels transitioning from 10 to 0, or 10 to 15, then either the GSDS or PU drive schemes may be used. Because the PU drive scheme is faster than the GSDS drive scheme, the PU drive scheme would generally be used. In alternative embodiments, any number of display states may be provided, e.g., 2, 4, 8, 32, 64, 256, etc.

Figure 6:
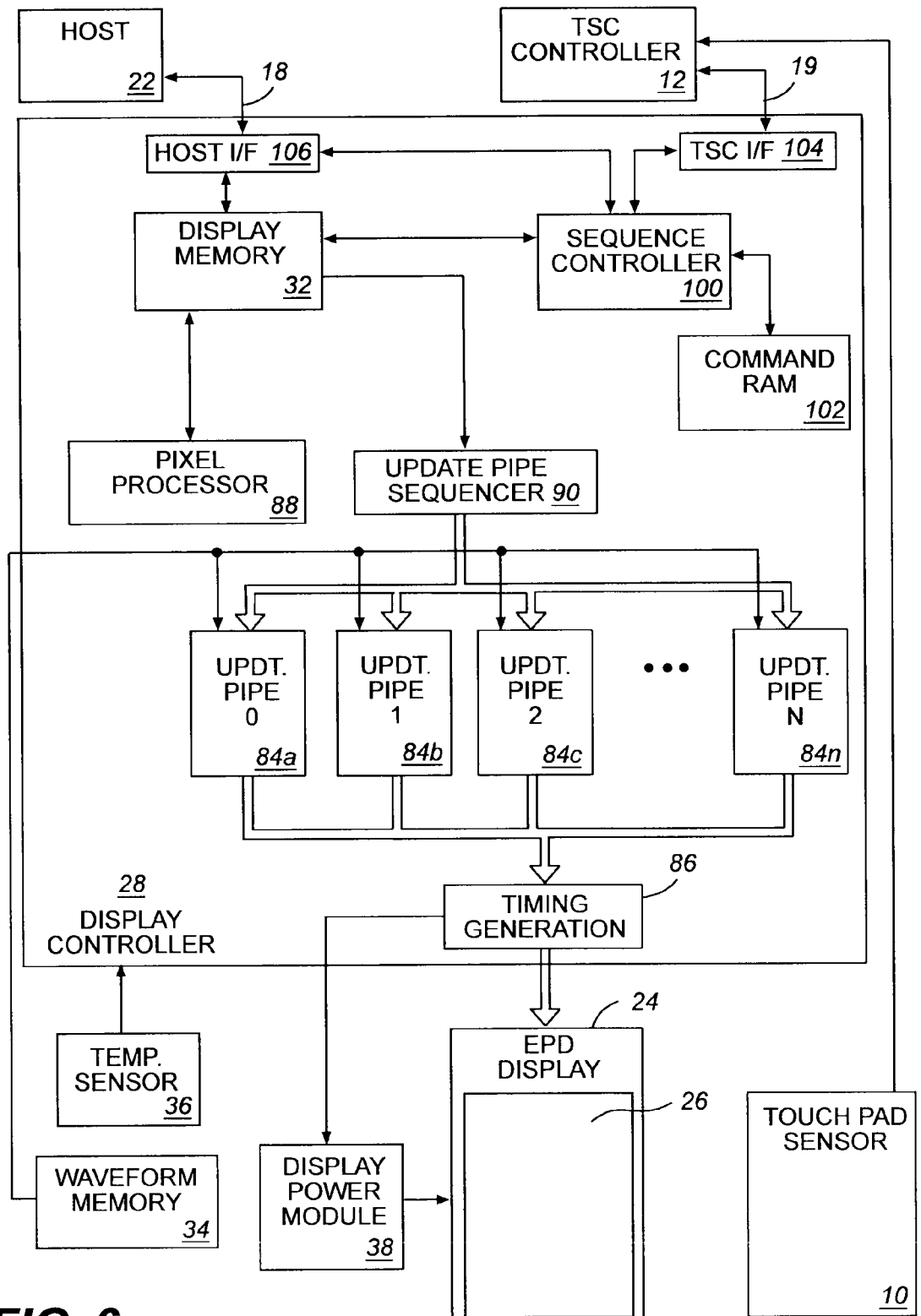
FIG. 6 is a block diagram of the display controller of FIG. 1 according to one embodiment, the display controller including a sequence controller.

FIG. 6 shows the display controller 28 of FIG. 1 in greater detail. The display controller 28 may include one or more update pipes 84, a timing generation unit 86, a pixel processor 88, and an update pipe sequencer 90. In addition, the display controller 28 may include a sequence controller 100 and a memory 102 ("command RAM"). Further, the display controller 28 may also include a touch screen controller interface 104 and a host interface 106.

Use of the display controller 28 permits the image displayed on the display device 24 to be divided into two or more regions and each of the regions may be updated in separate display update operations. Each display update operation may use a different drive scheme or update mode, and the display update operations may overlap in time. Each display update operation may use a different update pipe 84. The updating of a first region of the display matrix using a first update mode can begin even while a display update operation for updating a second region using a second update mode is in progress.

Use of the display controller 28 also includes an operability to receive a first coordinate location that corresponds with a first location on the touchpad sensor 10 that was touched by the pen 14 and to update corresponding display pixels of a first region of the display matrix. The display controller 28 may subsequently receive a second coordinate location that corresponds with a second location on the touchpad sensor 10 that was touched by the pen 14. The display controller 28 is operable to update corresponding display pixels of a second region of the display matrix. The updating of the first and second regions may be performed in first and second display update operations. The respective display update operations may use different drive schemes or update modes, and may overlap in time. In addition, the respective display update operations may use different update pipes 84. The display update operation for updating the second region may begin even though the display update operation for updating the first region is in progress.

The display memory 32 may be coupled with the host 22 via the host interface 106. In addition, the display memory 32 may be coupled with pixel processor 88, the update pipe sequencer 90, and the sequence controller 100. The sequence controller 100 may be coupled with the touch screen controller 12 via the touch screen controller interface 104. The command RAM 102 may be coupled with the sequence controller 100 and store commands to be executed by the sequence controller 100. The update pipe sequencer 90 may be coupled with the one or more update pipes 84, which in turn may be coupled with the timing generation unit 86.

Figure 7:
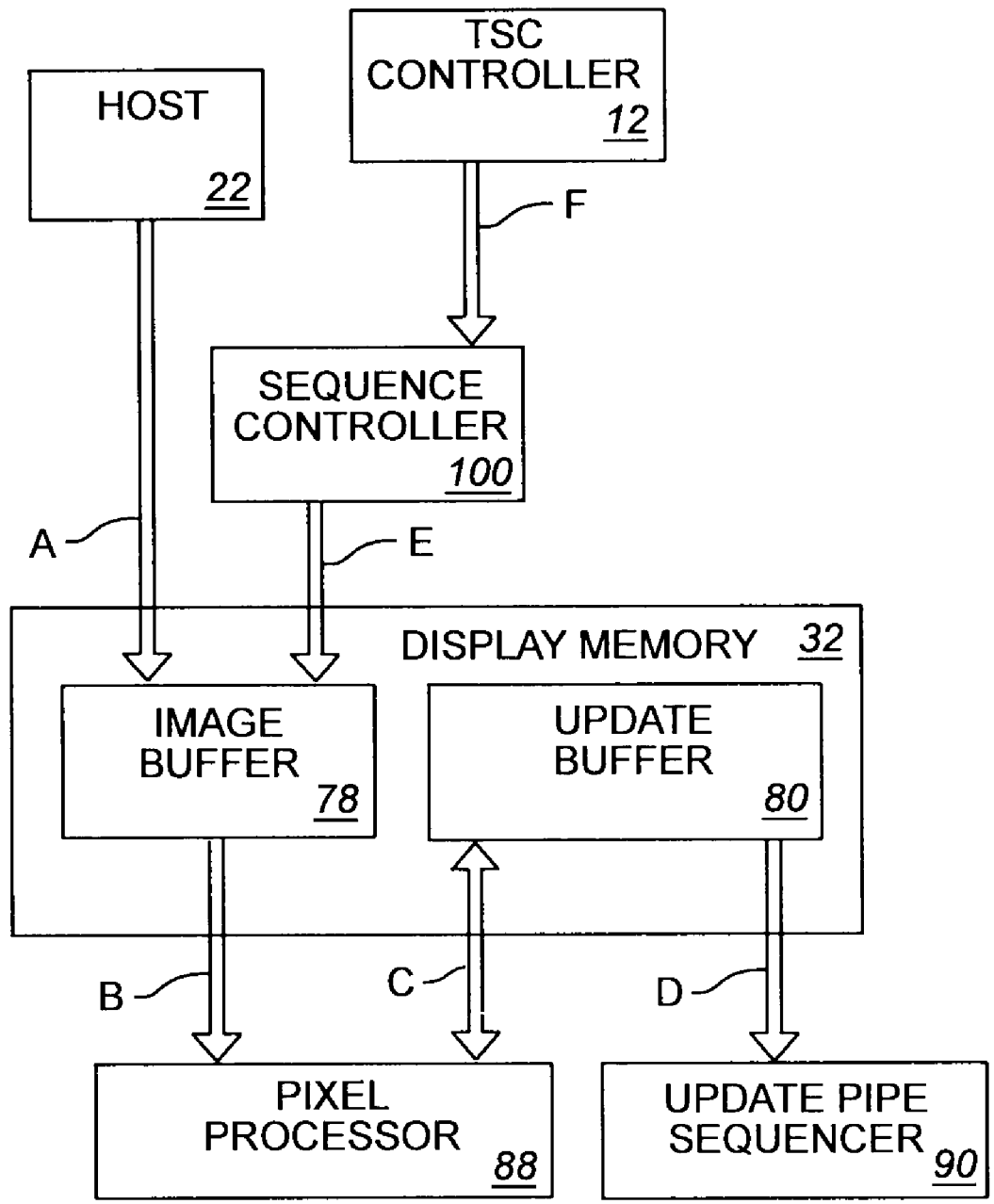
FIG. 7 is a block diagram showing exemplary data paths in the display system of FIG. 1.

FIG. 7 is a block diagram showing exemplary data paths between the display memory 32 and other components of the system 20 and display controller 28 used in pixel synthesis and display output operations described below. In one embodiment, the display memory 32 includes an image buffer 78 and an update buffer 80. The host 22 may write to the image buffer 78 via data path "A." (Although not shown in FIG. 7, the host 22 may also read from the display memory 32.) The pixel processor 88 may read from the image buffer 78 via data path "B." In addition, the pixel processor 88 may read from and write to the update buffer 80 via data path "C." The update pipe sequencer 90 may read from the update buffer 80 via data path "D." Further, the sequence controller 100 may write to the image buffer 78 via data path "E." The sequence controller 100 receives touch coordinates from the touch screen controller via data path "F."

The image buffer 78 may be used to store a frame of data pixels. The update buffer 82 may be used to store synthesized pixels. In one embodiment, a "synthesized pixel" is a data structure or a data record that defines a pixel transition. A synthesized pixel may include data defining a current display state and a next display state. A synthesized pixel may additionally include an identifier of an assigned update pipe 84.

The host 22 may store a full frame of data pixels or a portion of a frame of data pixels in the image buffer 78 using data path A. Alternatively, the sequence controller 100 may store one or more data pixels in the image buffer 78, such as when the sequence controller 100 is performing a pen input interface operation. The pixel processor 88 may include an operability to generate synthesized pixels. The pixel processor 88 may read a data pixel stored in the image buffer 78 to obtain data defining a next display state of a display pixel 40 using data path B. In one embodiment, the pixel processor 88 may read a synthesized pixel stored in the update buffer 80 to obtain data defining a current display state of a display pixel 40. The pixel processor 88 may read the synthesized pixel using data path C. The pixel processor 88 may use the data pixel obtained from the image buffer 78 and the synthesized pixel obtained from the update buffer 80 to generate a new synthesized pixel. The pixel processor 88 may store synthesized pixels that it generates in the update buffer 80 using data path C. The storing of a synthesized pixel in the update buffer 80 by the pixel processor 88 may overwrite a previously stored synthesized pixel.

The update pipe sequencer 90 may include an operability to perform one of the functions required in a display output operation. The update pipe sequencer 90 may fetch synthesized pixels from the update buffer 82 using data path D. The update pipe sequencer 90 may provide a synthesized pixel that it fetches to one of the update pipes 84. The update pipe sequencer 90 may determine which update pipe 84 to provide the synthesized pixel to by inspecting an update pipe identifier included in the synthesized pixel data structure.

Referring again to FIG. 6, in one embodiment, an update pipe 84 locates a drive scheme stored in the waveform memory 34 corresponding with a designated update mode and a current temperature. For each drive frame in the waveform period, the update pipe 84 copies all possible drive pulses for the drive scheme for the current drive frame and stores the current drive frame pulses in a lookup table associated with the update pipe. The update pipe 84 uses the current and next display states of a synthesized pixel to locate drive pulse data in the lookup table and stores the pulse data in a first-in-first-out memory ("FIFO") memory, which may be included within the update pipe. The FIFO memory is provided so that pulse data may be generated and buffered ahead of when it will be needed by the timing generation unit 86. The FIFO may be provided with one or more status flags that indicate the amount of drive pulse data present in the FIFO, e.g., full, half full, empty, etc.

The timing generation unit 86 includes an input that is coupled with the outputs of the update pipes 84. The timing generation unit 86 receives waveform data from the update pipes 84. The timing generation unit 86 provides waveform data to the display power module 38 and the display device 24 according to the timing requirements of the display device 24.

Figure 8:
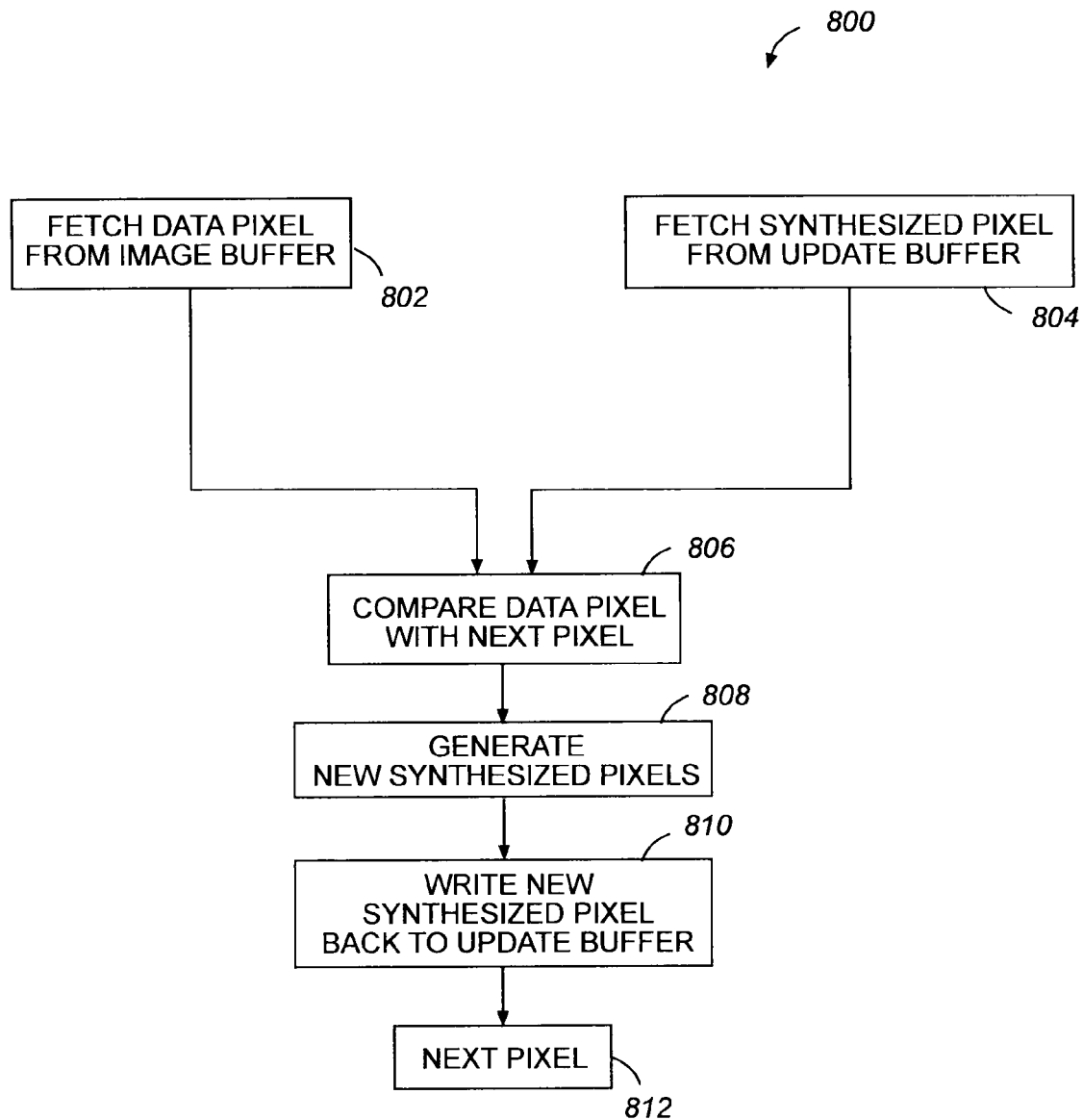
FIG. 8 is a flow diagram illustrating a pixel synthesis operation 800 according to one embodiment.

FIG. 8 is a flow diagram illustrating a pixel synthesis operation 800 according to one embodiment. In one embodiment, the pixel synthesis operation 800 may be performed by the pixel processor 88. In an operation 802, a data pixel is read or fetched from the image buffer 78. Data pixels may be read from the image buffer 78 in raster order beginning with the data pixel 40 in the upper left corner of the display matrix 26 according to one embodiment. In an operation 804, a synthesized pixel is read or fetched from the update buffer 80. Synthesized pixels may be read from the update buffer 80 in raster order beginning with the synthesized pixel corresponding with the data pixel in the upper left corner of the display matrix 26 according to one embodiment. The operation 802 may be performed prior to the operation 804, the operation 804 may be performed prior to the operation 802, or the operations 802 and 804 may be performed at the same time.

In operation 806, the fetched data pixel is compared with a next pixel value. The next pixel value is obtained from the synthesized pixel fetched in operation 804. A next pixel value is included in the data structure of each synthesized pixel and represents the current display state of a corresponding display pixel. Operation 806 compares the data pixel and the next pixel value to determine if they are equal. If the values are equal, i.e., the next and current display states are identical, the corresponding display pixel is not marked for updating. On the other hand, if the values differ, i.e., the next and current display states differ, and the corresponding display pixel is marked for updating.

In operation 808, a new synthesized pixel may be formed or generated. If the display pixel was not marked for updating in operation 806, a new synthesized pixel need not be formed. If the display pixel was marked for updating, the next pixel value obtained from the fetched synthesized pixel (operation 804) is set as the current pixel value in the new synthesized pixel. The value of the fetched data pixel (operation 802) is set as the next pixel value in the new synthesized pixel. In operation 810, the new synthesized pixel is written back to the update buffer 80. As indicated by operation 812, the pixel synthesis operation 800 repeats operations 802-810 for each pixel location in the display matrix 26 according to one embodiment.

Figure 9:
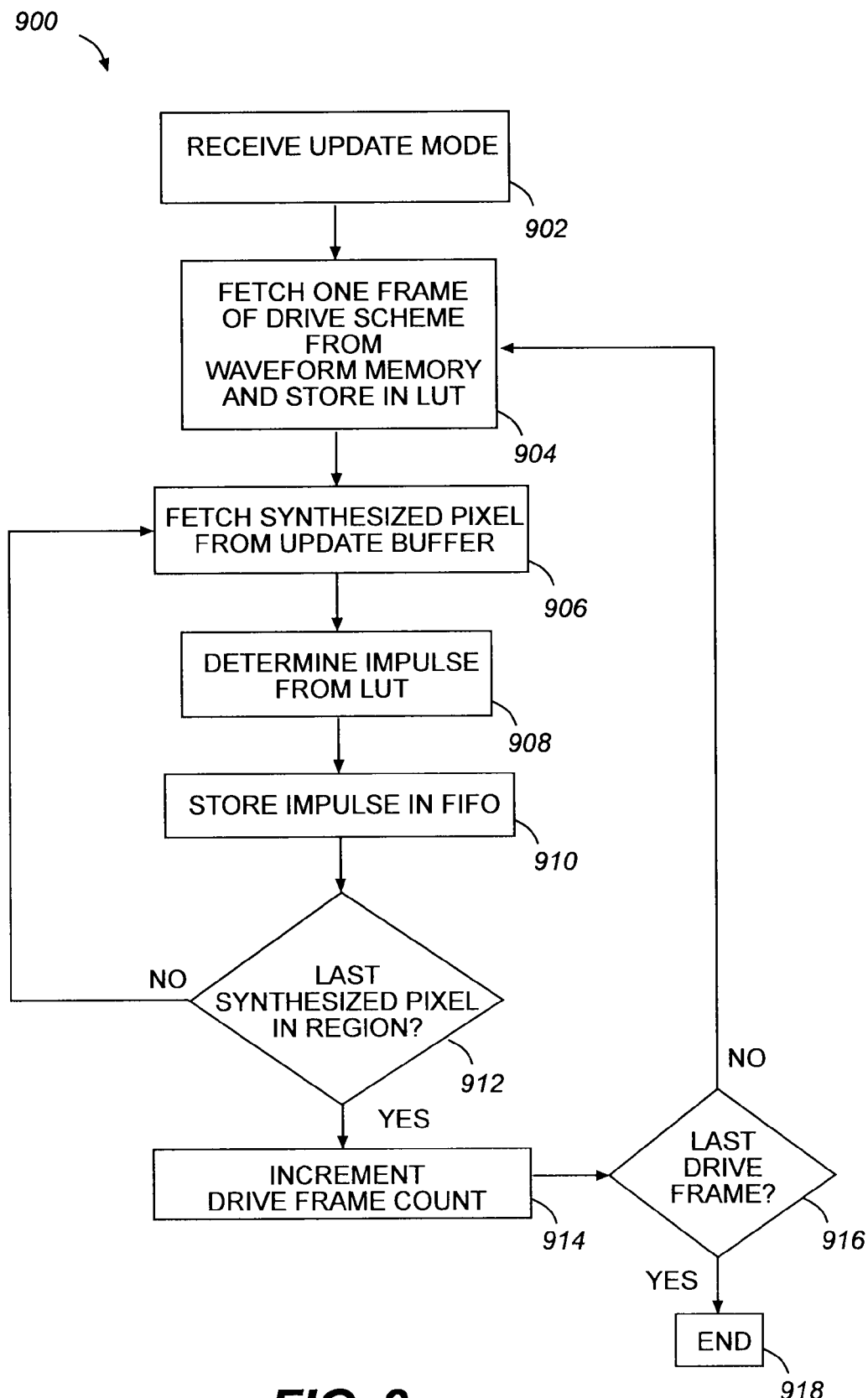
FIG. 9 is a flow diagram illustrating display output operation according to one embodiment.

FIG. 9 is a flow diagram illustrating a display output operation 900 according to one embodiment. In an operation 902, an update mode or drive scheme is received. In operation 904, one drive frame of the corresponding drive scheme is fetched from the waveform memory 34. Drive pulses for the current drive frame period may be stored in a lookup table ("LUT"). In operation 906, a synthesized pixel is fetched from the update buffer 80. Synthesized pixels of the display matrix 26 may be fetched from the update buffer 80 in raster order. In one embodiment, synthesized pixels of a submatrix 26 may be fetched in raster order. In operation 908, a drive impulse is determined for the fetched synthesized pixel. The drive impulse may be determined using the lookup table. In operation 910, the drive impulse may be stored in a FIFO memory that may be provided within an update pipe 84. In operation 912, a determination is made if the current synthesized pixel corresponds with the last pixel location in the update region. The update region may be the display matrix 26 or the submatrix 52. If not the last pixel location, steps 906-910 are repeated for each additional synthesized pixel in the update region. If the current synthesized pixel is the last synthesized pixel, a drive frame count is incremented in operation 914. In operation 916, a determination is made whether the current drive frame is the last drive frame in the drive scheme. If not the last drive frame period, steps 904-910 are repeated for each remaining drive frame period of the drive scheme.

Figure 10:
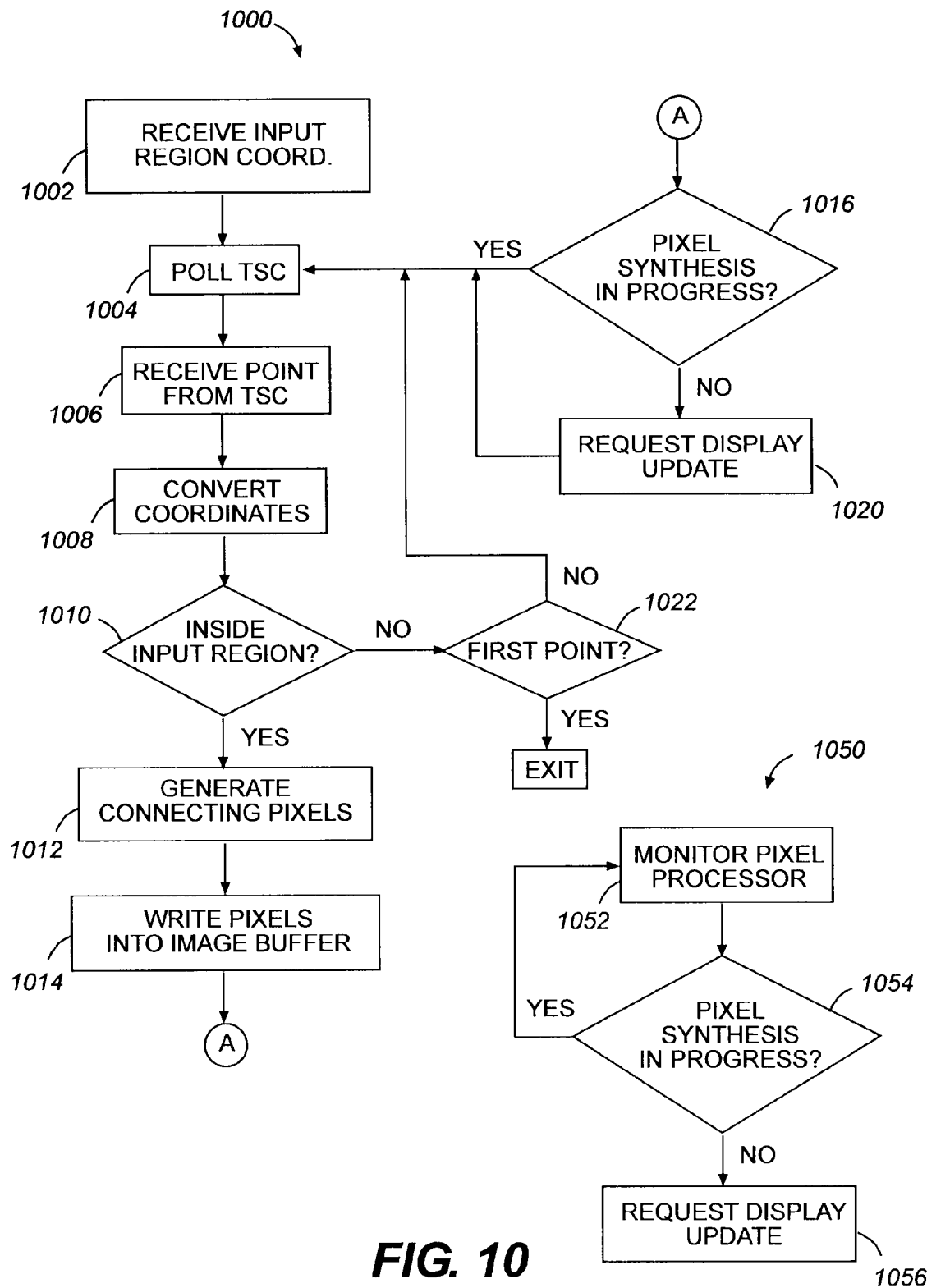
FIG. 10 is a flow diagram illustrating a pen drawing interface operation according to one embodiment.

FIG. 10 is a flow diagram of an operational flow 1000 illustrating a pen drawing interface operation according to one embodiment. The pen drawing interface operation may be performed by the sequence controller 100 executing instructions stored in a memory, such as the waveform memory 34, in one embodiment. The host 22 may transmit a command to initiate the pen capture interface operation 1000. In an operation 1002, the coordinates of a region or window ("input region") 16 in which detected pen input will be rendered are received. An exemplary input region 16 is depicted in FIG. 1. In one embodiment, the update region coordinates are defined in the coordinate space of the display matrix 26. The host 22 may transmit the coordinates of the input region 16. In addition, as part operation 1002, pen color and pen width data may be received. The host 22 may also transmit the pen color and pen width data.

In operation 1004, the touch screen controller 12 is repeatedly polled at predetermined intervals. In operation 1004, the display controller 28 waits for data from the touch screen controller 12.

In operation 1006, data defining a point of touch is received from the touch screen controller 12. This data may include a coordinate location in the coordinate space of the touch pad as well as data relating to touch pressure and other data. In operation 1008, the data from the touch screen controller 12 are converted into display pixels corresponding with the point of touch, the display pixels having coordinates in the coordinate space of the display matrix 26.

Figure 11:
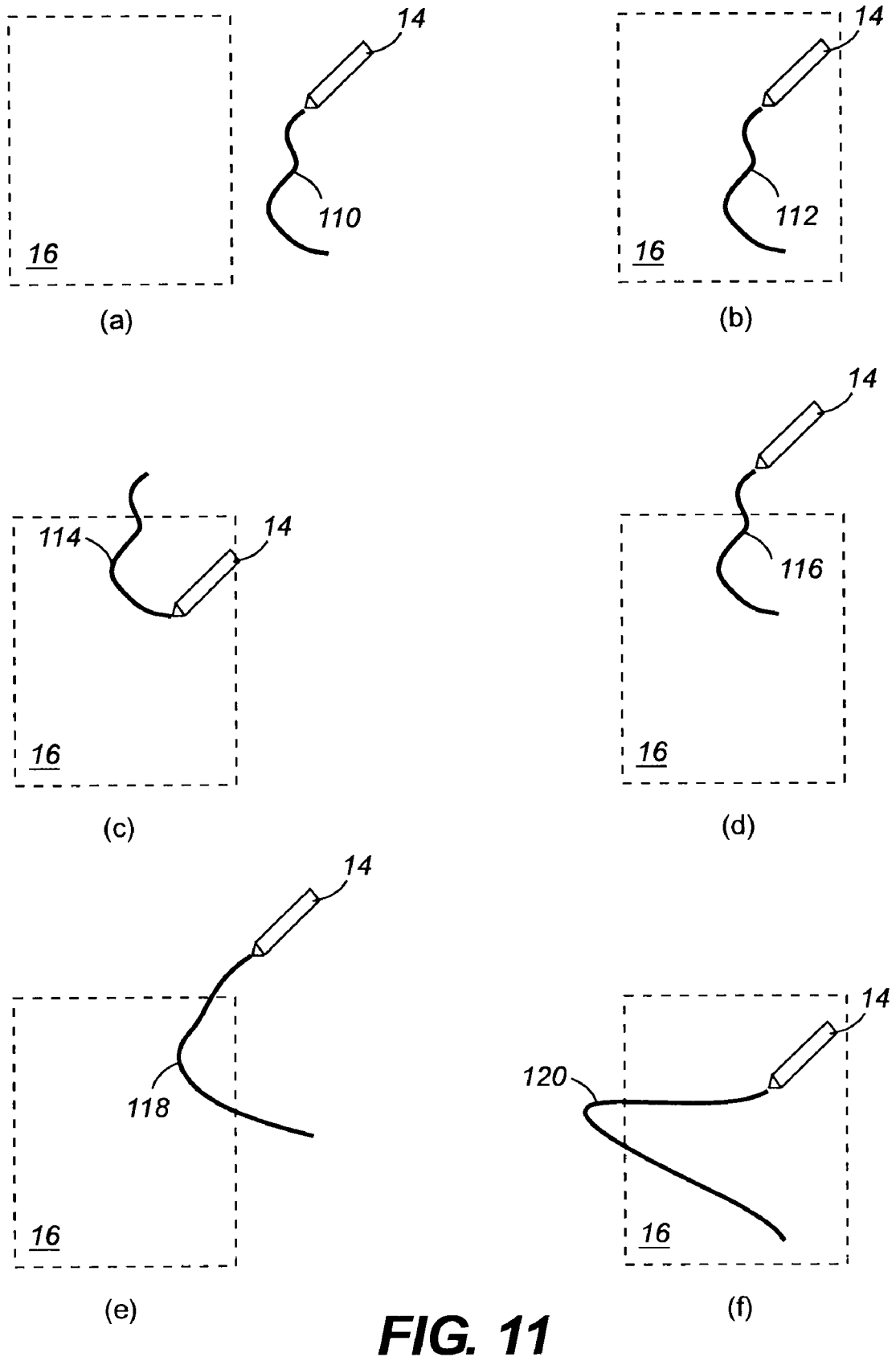
FIG. 11 is a schematic diagram illustrating exemplary pen strokes locations.

In operation 1010, the coordinates of the display pixels are evaluated to determine if the display pixels are within the input region 16. Display pixels within the input region 16 may be rendered on the display device 24. In one embodiment, display pixels outside of the input region 16 are not rendered on the display device 24. FIG. 11 is a schematic diagram illustrating exemplary pen stroke locations. Referring to FIG. 11, six cases are possible: (a) pen stroke 110 starts and ends outside of the input region 16, and the entire pen stroke 110 is outside of the update region; (b) pen stroke 112 starts and ends inside of the input region 16, and the entire pen stroke 112 is inside of the update region; (c) pen stroke 114 starts outside of the input region 16 but ends inside of the input region 16; (d) pen stroke 116 starts inside of the input region 16 but ends outside of the input region 16; (e) pen stroke 118 starts and ends outside of the input region 16, but includes a segment inside of the update region; and (f) pen stroke 120 starts and ends inside of the input region 16, but a segment of the entire pen stroke 120 is outside of the update region.

The touch screen controller 12 may sample at frequency that is not fast enough to sample every point of touch when the pen is moved rapidly. Accordingly, in these situations there may be a need to generate display pixels connecting the last display pixels and the current display pixels. If the display pixels are within the input region 16, display pixels connecting the display pixels of a point last received from the touch screen controller 12 and the display pixels of the point currently received from the TSC 12 are generated in operation 1012. The connecting pixels may be generated using any known interpolation technique.

In operation 1014, the display pixels of the current point from the TSC 12 and any connecting display pixels generated in the operation 1012 are written to the image buffer 78. Pen pressure data and the specified line width may be used to determine the number of display pixels to be written to the image buffer 78 in operation 1014. In operation 1016, it is determined if the pixel processor 88 is currently performing a pixel synthesis operation. If a pixel synthesis operation is not in process, a display update is requested in operation 1020, and the flow then returns to the operation 1004 of polling the TSC 12. If a pixel synthesis operation is in process, a pending update flag is set, and the flow then returns to the operation 1004 of polling the TSC 12. The pending update flag indicates that data pixels generated by the pen drawing interface operation 1000 have been stored in the image buffer 78, but have not been synthesized. Setting the pending update flag starts a process 1050.

The process 1050 includes an operation 1052, in which a busy flag of the pixel processor 88 is periodically read or monitored. In operation 1054, it is determined if the pixel processor is busy by, for example, inspecting the busy flag read in operation 1052. If the pixel processor is busy, monitoring continues. When the pixel processor 88 completes the pixel synthesis operation currently in progress, the busy flag read is reset. As the pixel processor is no longer busy, a display update is requested in operation 1056, and the process 1050 terminates.

Considering the negative path at operation 1010 of determining if the display pixels are within the input region 16, if the display pixels are determined to be outside of the input region 16, it is next determined in operation 1022 if the display pixels correspond with a first point of touch received from the TSC 12. If the display pixels correspond with a first point of touch, then the pen drawing operation 1000 may terminate. On the other hand, if the display pixels do not correspond with a first point of touch, the pen drawing operation 1000 operation advances to operation 1004.

In one embodiment, the sequence controller 100 executing instructions to perform pen drawing interface operations may provide a signal to the host 22 after data from the touch screen controller 12 has been converted into display pixels corresponding with the point of touch and the display pixels have been stored in the image buffer 78. For example, the sequence controller 100 may cause a host interrupt upon storing data pixels generated as a result of pen input. This notifies that host 22 that display pixels generated as a result of pen input are available to be read by the host from the image buffer 78 if the host has a need. In addition, in one embodiment, the host 22 may send a command to the display controller 28 at any time to terminate a pen drawing operation 1000 operation. In one alternative, a pen drawing operation may terminate if point of touch data received from the TSC 12 is outside of the input region 16.

As described above, data from the touch screen controller 12 are converted into display pixels defining a point or a pen stroke corresponding with one or more points of touch. In one embodiment, the display pixels defining a point or a pen stroke may be driven to their new display states using the same drive scheme. For example, the display pixels of all of the points received from the touch screen controller 12 may be driven using the PU drive schemes. However, this is not critical. In alternative embodiments, the display pixels for some of the points received from the touch screen controller 12 may be driven using a first drive scheme, while the display pixels for other of the touch points may be driven using a second drive scheme. For example, first display pixels corresponding with a first group of one or more touch points may be driven using the PU drive scheme, while second display pixels corresponding with a second group of one or more touch points may be driven using the MDS drive scheme. In addition, the display controller 28 may update one region of the display matrix 26 with display pixels unrelated to a pen drawing interface operation, while at the same time the display controller 28 may render pen input from the TSC 12 in another region of the display matrix 26. For instance, a first region may be updated with a menu or pop-up window using a first drive scheme, such as GSDS, while at the same time a second region may be updated with display pixels generated in a pen drawing interface operation using a second drive scheme, such as PU.

The sequence controller 100 executing instructions to perform pen drawing interface operations may operate independently from display update operations (pixel synthesis and display output). When touch point data from the TSC 12 is received, it may be processed without delay. Further, data pixels generated in a pen drawing interface operation are stored directly in the image buffer 78. In addition, once the data pixels are stored in the image buffer 78, a pixel synthesis operation may begin immediately or as soon as a pixel synthesis operation in process finishes. These features may provide a speed up over systems in which a host interfaces with a touch screen controller.

In a system where a host interfaces with a touch screen controller, there is a first time period needed to transmit data generated by a touch screen controller to the host, there is a second time period needed for the host to process the data received from the touch screen controller, and a third time period is needed to transmit and store data pixels in an image buffer. In addition, there may be a fourth time period to issue a display update command to a display controller. The data and the command may be transmitted over busses. Because data pixels generated from touch point data received from the TSC 12 are stored directly in the image buffer 78, delays due to bus transmission of data may be reduced. Further, because a pixel synthesis operation may begin immediately or as soon as a pixel synthesis operation in process finishes, delays due to bus transmission of a display update command may be reduced. Accordingly, the amount of processing time associated with displaying a pen stroke captured by the sensor may be reduced as compared with having a host perform pen drawing interface operations.

The pen drawing interface operations and the pixel synthesis operation effectively share the image buffer 78. This feature may result in reduced memory requirements in comparison with other systems. For example, it is not necessary to provide a separate memory for pen drawing interface operations. A buffer for pixel data generated by a pen drawing interface operation, but waiting from a display update operation, may not be necessary.

Additional pen stroke capture latency reductions may result from having the pen drawing interface operation on the same chip with the display engine and having the pen drawing interface operation and display update operations share the image buffer 78.

According to one embodiment, the need for a host to perform pen drawing interface operations may not be necessary. In addition to eliminating bus traffic for transmitting data to and from the host (which saves power), this aspect also eliminates host processing, allowing a host to attend to other tasks, or to enter a power-saving sleep mode.

In one embodiment, the touch pad sensor 10 may employ electromagnetic resonance to detect points of contact. In one embodiment, the touch pad sensor 10 may alternately sends and detects signals, and the pen 14 may generate a signal in response to a signal sent by the sensor 10. In alternative embodiments, the touch pad sensor 10 and pen 14 may employ resistive, capacitive, acoustic, light pen or any other suitable technology.

In one embodiment, some or all of the operations and methods described in this description may be performed by hardware, software, or by a combination of hardware and software.

In one embodiment, some or all of the operations and methods described in this description may be performed by executing instructions that are stored in or on a computer-readable medium. The term "computer-readable medium" may include, but is not limited to, non-volatile memories, such as EPROMs, EEPROMs, ROMs, floppy disks, hard disks, flash memory, and optical media such as CD-ROMs and DVDs.

In this description, references may be made to "one embodiment" or "an embodiment." These references mean that a particular feature, structure, or characteristic described in connection with the embodiment is included in at least one embodiment of the claimed inventions. Thus, the phrases "in one embodiment" or "an embodiment" in various places are not necessarily all referring to the same embodiment. Furthermore, particular features, structures, or characteristics may be combined in one or more embodiments.

Although embodiments have been described in some detail for purposes of clarity of understanding, it will be apparent that certain changes and modifications may be practiced within the scope of the appended claims. Accordingly, the described embodiments are to be considered as illustrative and not restrictive, and the claimed inventions are not to be limited to the details given herein, but may be modified within the scope and equivalents of the appended claims. Further, the terms and expressions which have been employed in the foregoing specification are used as terms of description and not of limitation, and there is no intention in the use of such terms and expressions to exclude equivalents of the features shown and described or portions thereof, it being recognized that the scope of the inventions are defined and limited only by the claims which follow.

What is claimed is:

1. A method, comprising:
receiving first touch point data from a sensor by a first unit;
generating first data pixels corresponding with the received first touch point data, the first data pixels being generated by the first unit; and
updating first display pixels of a display matrix of a display device with the first data pixels using a first drive scheme, the display pixels of the display device having multiple stable display states;
receiving second touch point data from the sensor by the first unit;
generating second data pixels corresponding with the received second touch point data, the second data pixels being generated by the first unit;
updating second display pixels of the display matrix with the second data pixels using a second drive scheme, wherein the updating of the second display pixels overlaps in time with the updating of the first display pixels.

2. The method of claim 1, wherein the first and second drive schemes are different drive schemes.

3. The method of claim 1, further comprising determining by the first unit if a pixel synthesis operation is in progress, and if a pixel synthesis operation is not in progress, requesting a pixel synthesis operation by the first unit.

4. The method of claim 1, further comprising determining by the first unit if a pixel synthesis operation is in progress, and if a pixel synthesis operation is in progress, monitoring by the first unit of the pixel synthesis operation in progress to determine when the pixel synthesis operation finishes, and upon determining that the pixel synthesis operation in progress has finished, requesting a pixel synthesis operation by the first unit.

5. The method of claim 1, wherein the first unit includes a memory to store data pixels and synthesized pixels, and the updating of the first display pixels of the display matrix includes storing the generated first data pixels in the memory.

6. The method of claim 1, wherein the first data pixels are located within a first display submatrix of the display matrix and the second data pixels are located within a second display submatrix of the display matrix, the first and second submatrices being different submatrices.

7. The method of claim 5, wherein the first and second drive schemes are different drive schemes.

8. The method of claim 1, wherein the display device is an electrophoretic display device.

9. The method of claim 1, wherein each of the method operations is embodied as a program of instructions on non-transitory computer-readable media.

10. A display controller, comprising:
a first unit to receive touch point data from a sensor and to generate data pixels corresponding with the received touch point data; and
a second unit to perform display update operations, the display update operations including generating synthesized pixels from data pixels and outputting signals to cause drive pulses to be provided to display pixels of a display matrix of a display device in two or more drive frames, wherein the first unit operates independently from the second unit;
wherein the second unit is operable to:
generate first data pixels from first touch point data and first synthesized pixels from the first data pixels;
generate second data pixels from second touch point data and second synthesized pixels from the second data pixels, and
perform a first display update operation with respect to first display pixels of the display matrix and perform a second display update operation with respect to second display pixels of the display matrix, wherein the first and second display update operations overlap in time.

11. The display controller of claim 10, wherein the first update operation is performed using the first data pixels and a first drive scheme, and the second update operation is performed using the second data pixels and a second drive scheme, the first and second drive schemes being different drive schemes.

12. The display controller of claim 10, wherein the first unit determines if a pixel synthesis operation is in progress, and if a pixel synthesis operation is not in progress, requests a pixel synthesis operation.

13. The display controller of claim 10, wherein the first unit determines if a pixel synthesis operation is in progress, and if a pixel synthesis operation is in progress, the first unit monitors the pixel synthesis operation in progress to determine when the pixel synthesis operation finishes, and upon determining that the pixel synthesis operation in progress has finished, requests a pixel synthesis operation.

14. The display controller of claim 10,
wherein the first display pixels are located within a first display submatrix of the display matrix, the second display pixels are located within a second display submatrix of the display matrix, and the first and second display submatrices are different submatrices.

15. The display controller of claim 14, wherein the first update operation is performed using a first drive scheme, and the second update operation is performed using a second drive scheme, the first and second drive schemes being different drive schemes.

16. The display controller of claim 10, further comprising a memory to store data pixels and synthesized pixels.

17. The display controller of claim 10, wherein the first unit is coupled directly with the sensor.

18. The display controller of claim 10, wherein the display device is an electrophoretic display device.

19. A system, comprising:
a sensor to generate touch point data;
an electrophoretic display device; and
a display controller to receive touch point data directly from the sensor and to generate data pixels corresponding with the received touch point data, and to perform display update operations, the display update operations including generating synthesized pixels from data pixels and outputting signals to cause drive pulses to be provided to display pixels of a display matrix of the display device in two or more drive frames, wherein the display controller is operable to receive touch point data from the sensor and to generate data pixels independently from performing display update operations;

wherein the display controller is operable to:
generate first data pixels from first touch point data and first synthesized pixels from the first data pixels, the first touch point data being received at a first time;
generate second data pixels from second touch point data and second synthesized pixels from the second data pixels, the second touch point data being received at a second time subsequent to the first time, and
perform a first display update operation with respect to first display pixels of the display matrix and perform a second display update operation with respect to second display pixels of the display matrix, wherein the first and second display update operations overlap in time.

20. The system of claim 19, wherein the first display pixels are located within a first display submatrix of the display matrix, the second display pixels are located within a second display submatrix of the display matrix, and the first and second display submatrices are different submatrices.

* * * * *